US011269818B2

(12) United States Patent
Rice et al.

(10) Patent No.: US 11,269,818 B2
(45) Date of Patent: Mar. 8, 2022

(54) SMART VERSIONING FOR FILES

(71) Applicant: MICROSOFT TECHNOLOGY LICENSING, LLC, Redmond, WA (US)

(72) Inventors: Stephen Lincoln Rice, Redmond, WA (US); Jonathan Alexander Bockelman, Kirkland, WA (US); Marcelo Albuquerque Mas, Redmond, WA (US); Joseph Arthur Metzger, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 282 days.

(21) Appl. No.: 15/978,787

(22) Filed: May 14, 2018

(65) Prior Publication Data

US 2019/0294687 A1 Sep. 26, 2019

Related U.S. Application Data

(60) Provisional application No. 62/647,453, filed on Mar. 23, 2018.

(51) Int. Cl.
*G06F 16/18* (2019.01)
*G06F 16/11* (2019.01)
(Continued)

(52) U.S. Cl.
CPC .......... *G06F 16/1873* (2019.01); *G06F 16/11* (2019.01); *G06F 16/13* (2019.01);
(Continued)

(58) Field of Classification Search
CPC ...... G06F 9/5083; G06F 21/50; G06F 40/197; G06F 16/1873; G06F 16/1727; G06F 16/13; G06F 16/1734; G06F 16/11
See application file for complete search history.

(56) References Cited

U.S. PATENT DOCUMENTS

| | | | | |
|---|---|---|---|---|
| 10,257,052 B1* | 4/2019 | Lonborg | ................. | H04L 41/50 |
| 2009/0132520 A1* | 5/2009 | Nemeth | .................. | G06F 16/48 |

(Continued)

OTHER PUBLICATIONS

"International Search Report and Written Opinion Issued in PCT Application No. PCT/US19/022381", dated Jun. 14, 2019, 10 Pages.

*Primary Examiner* — Mariela Reyes
*Assistant Examiner* — Courtney Harmon
(74) *Attorney, Agent, or Firm* — Scott Y. Shigeta; Newport IP, LLC

(57) ABSTRACT

A system enabling smart versioning of files is provided. Techniques disclosed herein enable a system to snap to new versions of a file based on one or more measures of user interactions with the file. For instance, a system can create a new version number for a file based on an amount of time a user has spent editing the file, a number of saves that have occurred, and/or a quantity of data applied to edits of the file. The techniques disclosed herein can also utilize telemetry data to fine tune weightings that are applied to data measuring specific types user activity to provide results that best serve a range of use scenarios and file types. By providing version numbers of a file that are based on user interactions, a system can provide more meaningful version numbers that are aligned with the contents of a file.

19 Claims, 12 Drawing Sheets

(51) Int. Cl.
*G06F 16/13* (2019.01)
*G06F 16/17* (2019.01)
*G06F 40/197* (2020.01)

(52) U.S. Cl.
CPC ...... *G06F 16/1727* (2019.01); *G06F 16/1734* (2019.01); *G06F 40/197* (2020.01)

(56) References Cited

U.S. PATENT DOCUMENTS

| | | | | |
|---|---|---|---|---|
| 2012/0096088 | A1* | 4/2012 | Fahmy | G06Q 30/02 |
| | | | | 709/204 |
| 2012/0117463 | A1* | 5/2012 | Inglis | G06F 40/58 |
| | | | | 715/255 |
| 2014/0032502 | A1* | 1/2014 | Kraley | G06F 40/197 |
| | | | | 707/663 |
| 2014/0280204 | A1* | 9/2014 | Avery | G06F 16/3334 |
| | | | | 707/748 |
| 2017/0185573 | A1 | 6/2017 | Milvaney | |
| 2017/0323233 | A1* | 11/2017 | Bencke | G06N 20/20 |
| 2017/0345459 | A1* | 11/2017 | Manville | H04N 21/23439 |

* cited by examiner

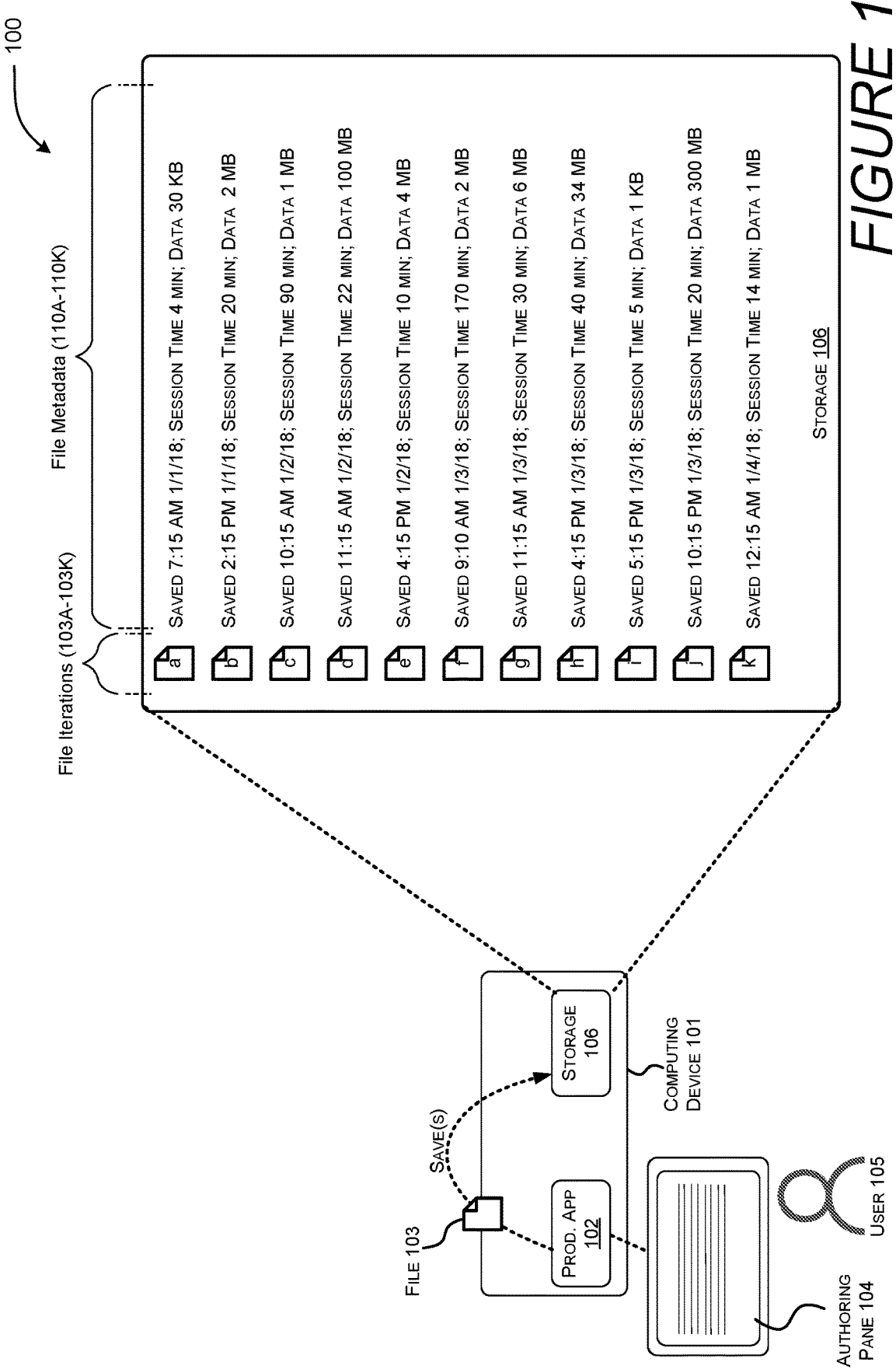

VERSION 1.0 — SAVED 11:15 AM 1/2/18; SESSION TIME 2 MIN; DATA 100 MB, V 1.0

VERSION 2.0 — SAVED 5:15 PM 1/3/18; SESSION TIME 5 MIN; DATA 1 KB, V 2.0

VERSION 3.0 — SAVED 12:15 AM 1/4/18; SESSION TIME 140 MIN; DATA 1 MB, V 3.0

STORAGE 106

*FIGURE 2B*

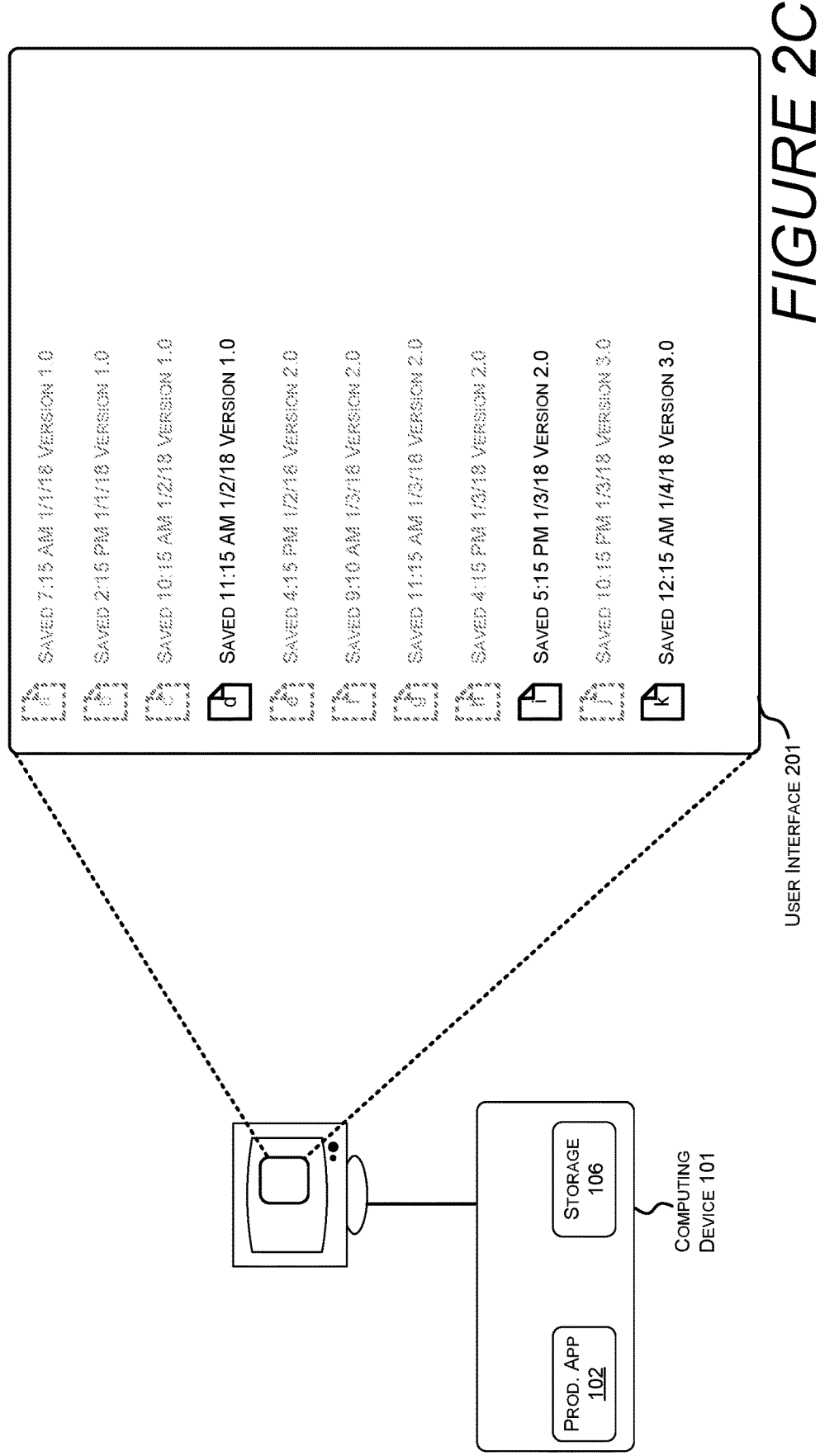

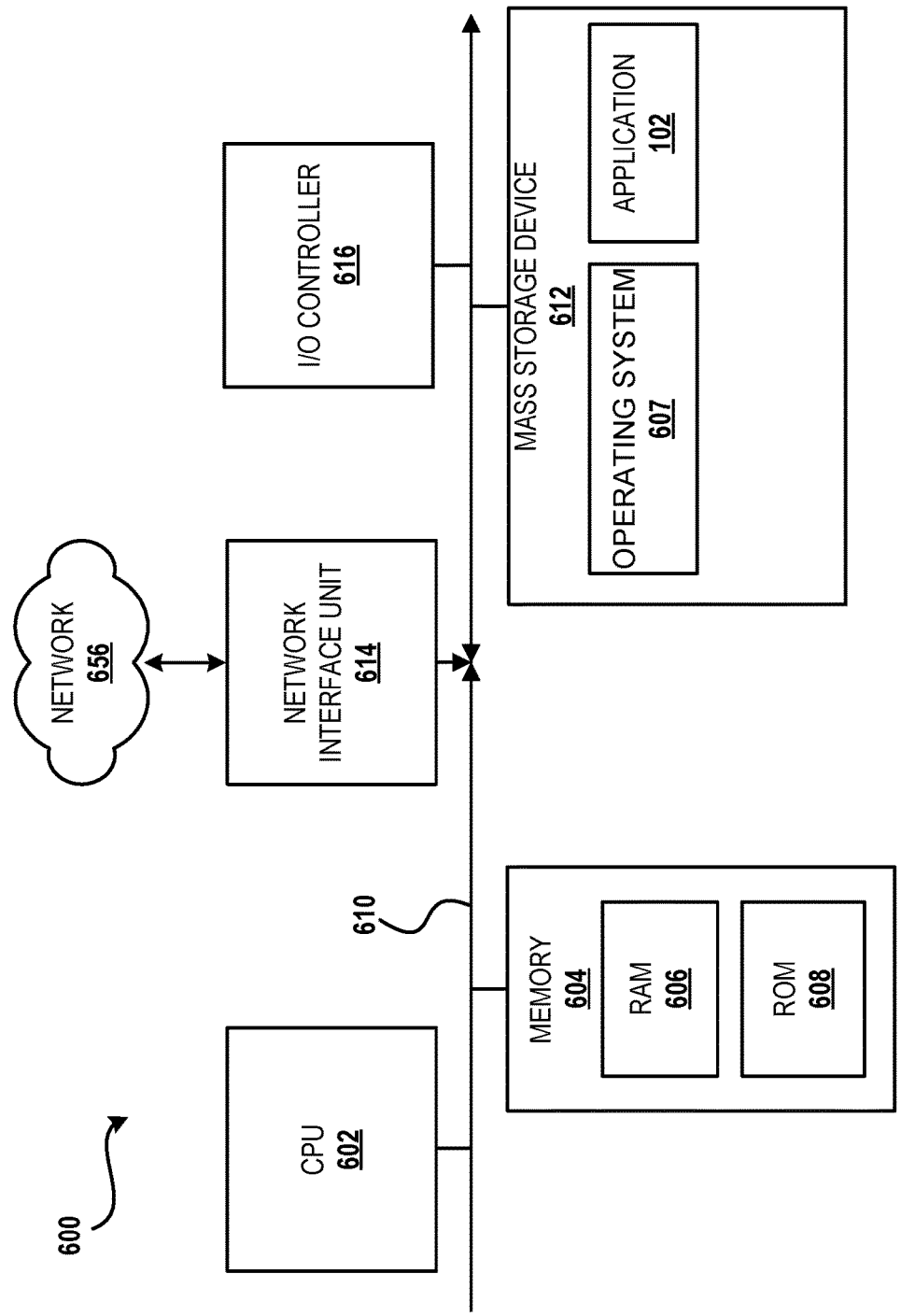

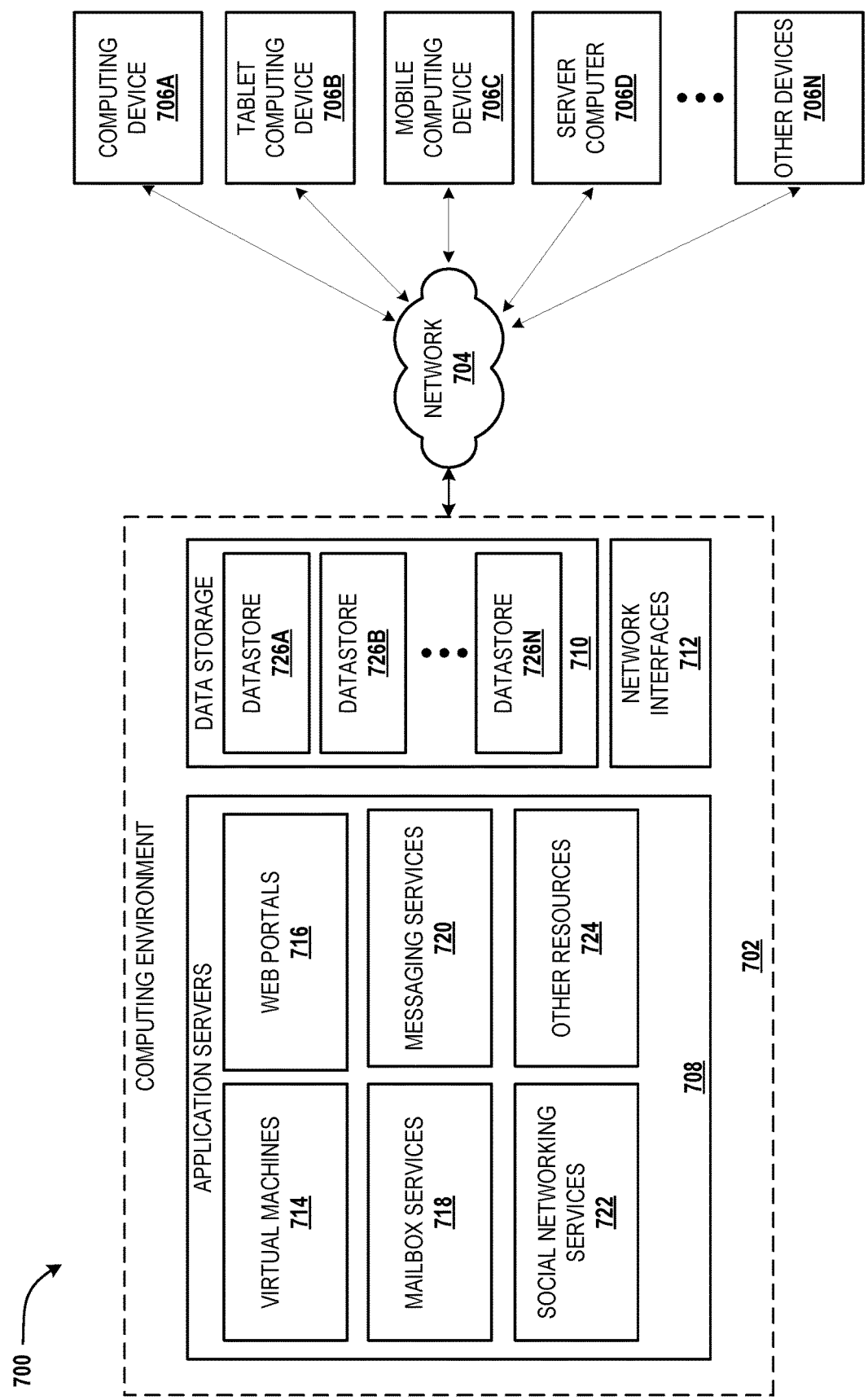

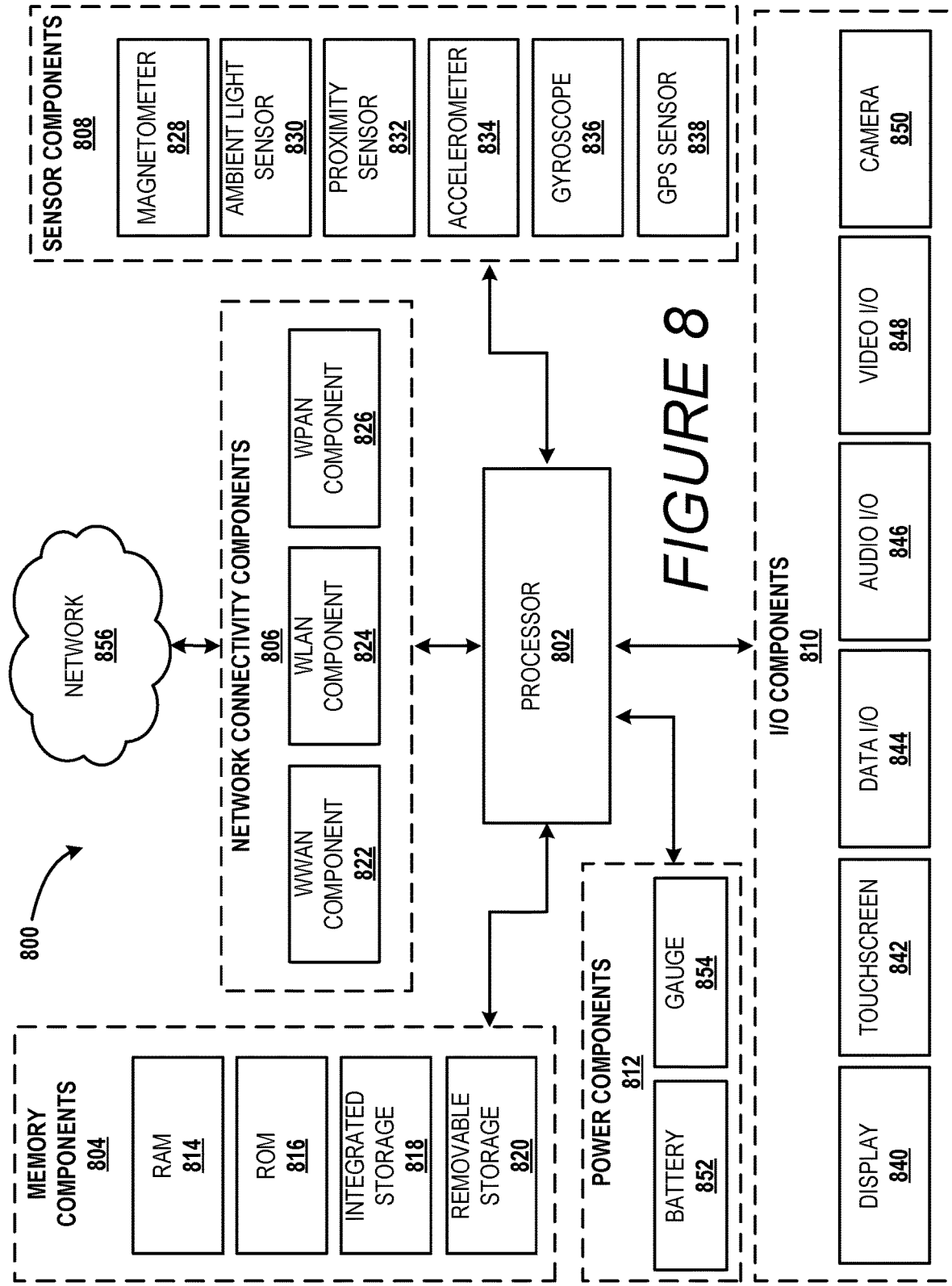

SMART VERSIONING FOR FILES

CROSS-REFERENCE TO RELATED APPLICATIONS

This application claims priority under 35 U.S.C. § 119(e) to U.S. Provisional Patent Application No. 62/647,453, filed on Mar. 23, 2018 and titled "SMART VERSIONING FOR FILES," the entire disclosure of which is expressly incorporated in its entirety by reference herein.

BACKGROUND

A version number is a unique number assigned to a file. Version numbers are helpful for users and computer systems for a number of reasons. For instance, version numbers are often used in the storage, retrieval, and management of files. Version numbers are also used in a number of workflows in many different industries. For example, version numbers can be used to help manage files that are a part of a publication process, a software development process, a cloud storage management process, etc.

Versioning is a process by which a document repository monitors the history of a document and assigns version numbers to various iterations of the document. There are a few technologies used for generating version numbers for documents. For instance, versioning can be done on a periodic basis, e.g. a document may snap to a new version number every 10 minutes. This type of approach does not really help users or systems identify significant milestones in the development of a particular document. Such techniques are typically out of sync with an amount of work that is performed on a document, and certainly, such techniques provide no causal relationship between a version number and the contents of a document. Such shortcomings can lead to other inefficiencies in how a computer system manages documents and a range of inefficiencies that may be caused in a work environment.

It is with respect to these and other considerations that the disclosure made herein is presented.

SUMMARY

The techniques disclosed herein enable systems to provide smart versioning of files. More specifically, systems disclosed herein can snap to new versions of a file based on one or more measures of user interactions with the file. For instance, a system can create a new version number for a file based on an amount of time a user has spent editing the file, a number of saves that have occurred, and/or a quantity of data applied to edits of the file. The techniques disclosed herein can also utilize telemetry data to fine tune weightings that are applied to data measuring specific types user activity to provide results that best serve a range of use scenarios and file types.

By providing version numbers of a file that are based on user interactions, a system can provide more meaningful version numbers that are aligned with the contents of a file. Further, the techniques disclosed herein can improve a number of efficiencies of systems that rely on version numbers to store, retrieve, and manage files. For instance, when a system identifies files for associating contextually-accurate version numbers as described herein, a system can store fewer files thereby saving storage space and energy. From a user's perspective, when a system identifies files for associating contextually-accurate version numbers as described herein, a system can present fewer document iterations to a user thereby improving a user's interaction with a computer. Improved user interaction can lead to the reduction of inadvertent inputs, and based on which other efficiencies, including production efficiencies and network usage efficiencies, can improve.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 1 is a block diagram of a system for providing smart versioning for files.

FIG. 2B is a list of file iterations and associated version numbers generated by a system providing smart versioning for files.

FIG. 2C is a screenshot of a user interface generated by a system providing smart versioning for files.

FIG. 6 is a computer architecture diagram illustrating an illustrative computer hardware and software architecture for a computing system capable of implementing aspects of the techniques and technologies presented herein.

FIG. 7 is a diagram illustrating a distributed computing environment capable of implementing aspects of the techniques and technologies presented herein.

FIG. 8 is a computer architecture diagram illustrating a computing device architecture for a computing device capable of implementing aspects of the techniques and technologies presented herein.

DETAILED DESCRIPTION

Figure 2A:
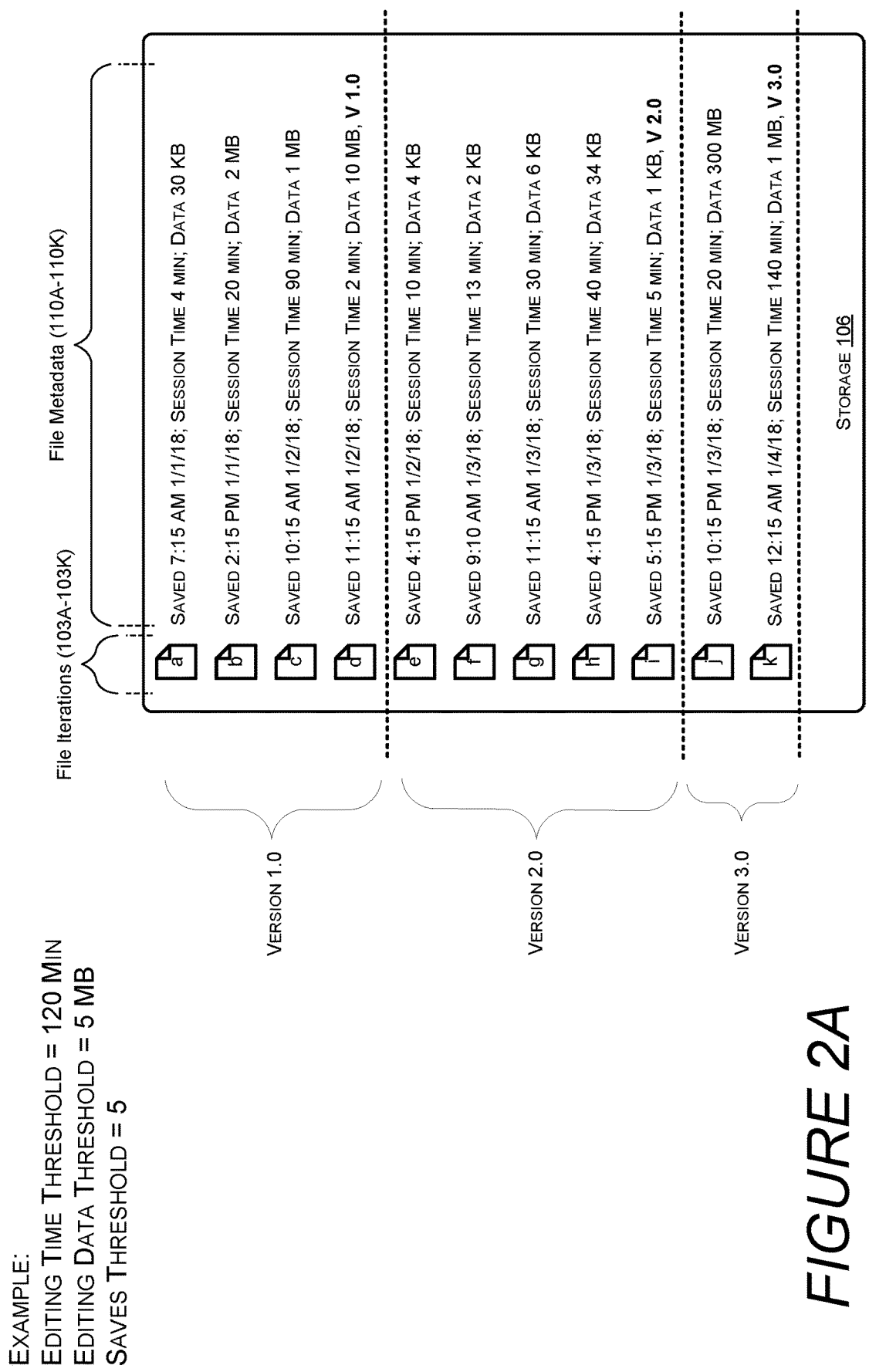
FIG. 2A is a sample data set that can be processed by a system providing smart versioning for files.

Referring now to FIG. 1, a system 100 using a sample data set is provided to illustrates aspects of the present disclosure. In this example, a system 100 comprises a computing device 101 operating a productivity application 102 for modifying a file 103. In some configurations, the productivity application 102 can display an authoring pane 104 to a user 105. The computing device 101 and the productivity application 102 are configured to save the file 103 in a storage device 106.

Each time the user 105 saves the file 103 to the storage device 106, an iteration of the file is saved to the storage device 106. Each iteration comprises edits that were applied to the file 103. In this example, there are eleven iterations (individually referred to herein as iterations 103A-103K) of the file 103. The computing device 101 can also generate and store metadata (individually referred to herein as metadata 110A-110K) associated with each iteration. In this example, the metadata 110 defines a number of attributes for each iteration of the file 103, such as a time stamp of a save, data indicating an amount of time applied to edits of the file, and a quantity of data applied to edits of the file.

The amount of time applied to edits of the file can be based on a range of different types of user activity. In one example, the amount of time applied to edits of the file can be based on a time period a file is opened by an application, such as Word, Excel, Google Docs, Sheets, Photoshop, etc. In a multi-user editing session, the amount of time may be measured from the start of an editing session of the first user that opened the file to the end of an editing session of the last user that closed the file. These examples are provided for illustrative purposes and are not to be construed as limiting. Other mechanisms for measuring an amount of time for measuring any type of editing activity of a file can be used with the techniques disclosed herein.

The quantity of data applied to edits of a file can be based on a range of different types of user activity. In one example, the quantity of data apply to edits of a file can be an absolute number with respect to data that is applied to, and removed from, a file. For instance, if a user edits a file and adds 4 KB of text, the quantity of data applied to the edits of the file is 4 KB. In addition, if the user continues to edit the file and removes 4 KB of text, the quantity of data applied to the edits of the file would then be 8 KB. Thus, in some configurations, the quantity of data applied to edits of a file is not always indicated by the net change in file size. Measurement of an absolute number, or a count of accumulated data used to interact with a file, allows a system to measure the level of activity associated with the file. Conversely, a system that only measures a change in the file size does not accurately represent user activity of a file.

A system can create a new version number of a file based on a number of factors. For example, a system can create a new version number based on an amount of time a user has spent editing the file, a number of saves that have occurred for the file, and/or a quantity of data applied to edits of the file. Other factors such as a frequency of certain activities, e.g., saves per unit of time or a quantity of data applied to edits per unit of time, can also be used to determine when a version number should be generated and applied to one or more iterations of a file.

Figure 3A:
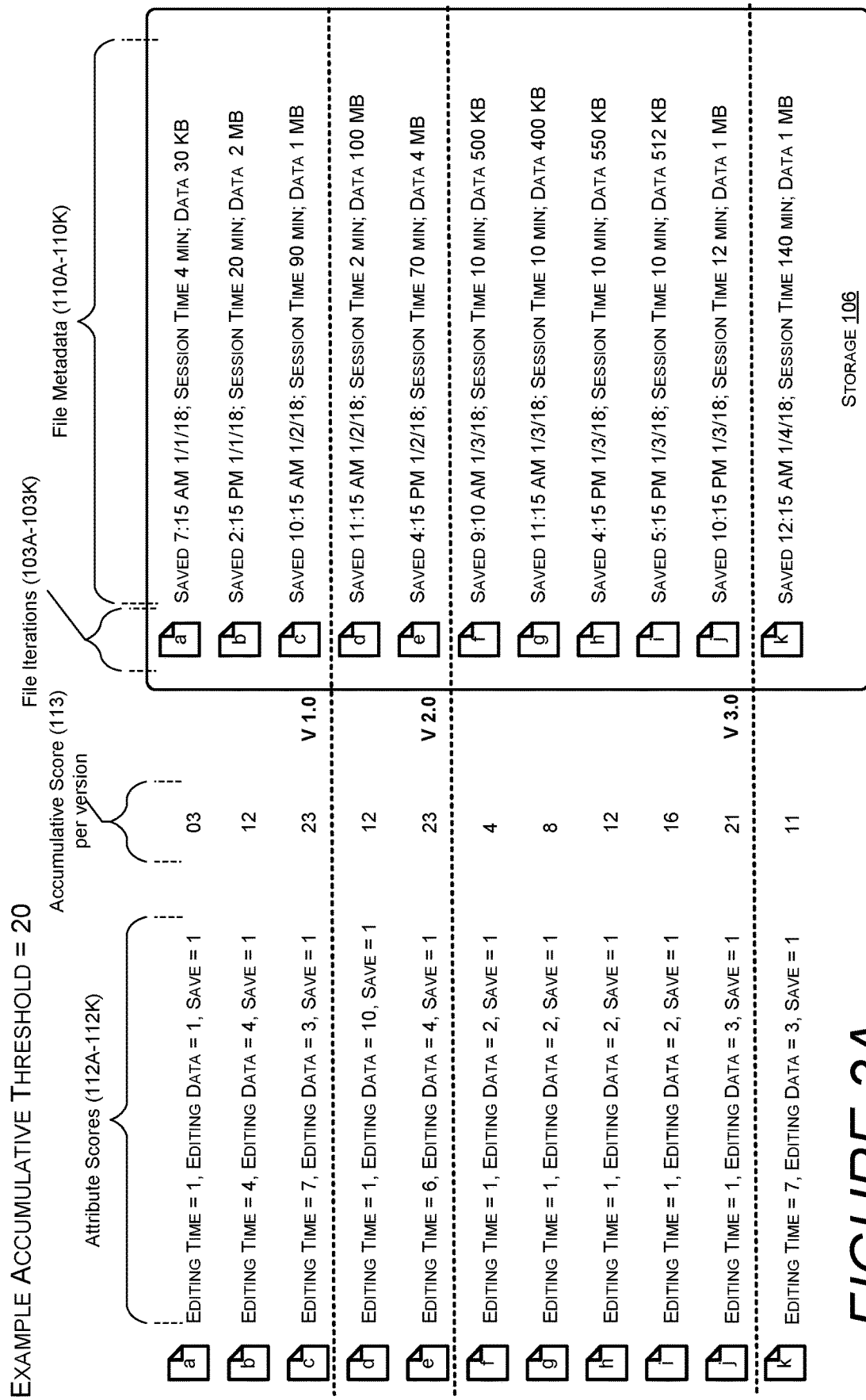
FIG. 3A is another sample data set used for generating attribute scores, accumulative scores, and resulting version numbers for a file.
Figure 3B:
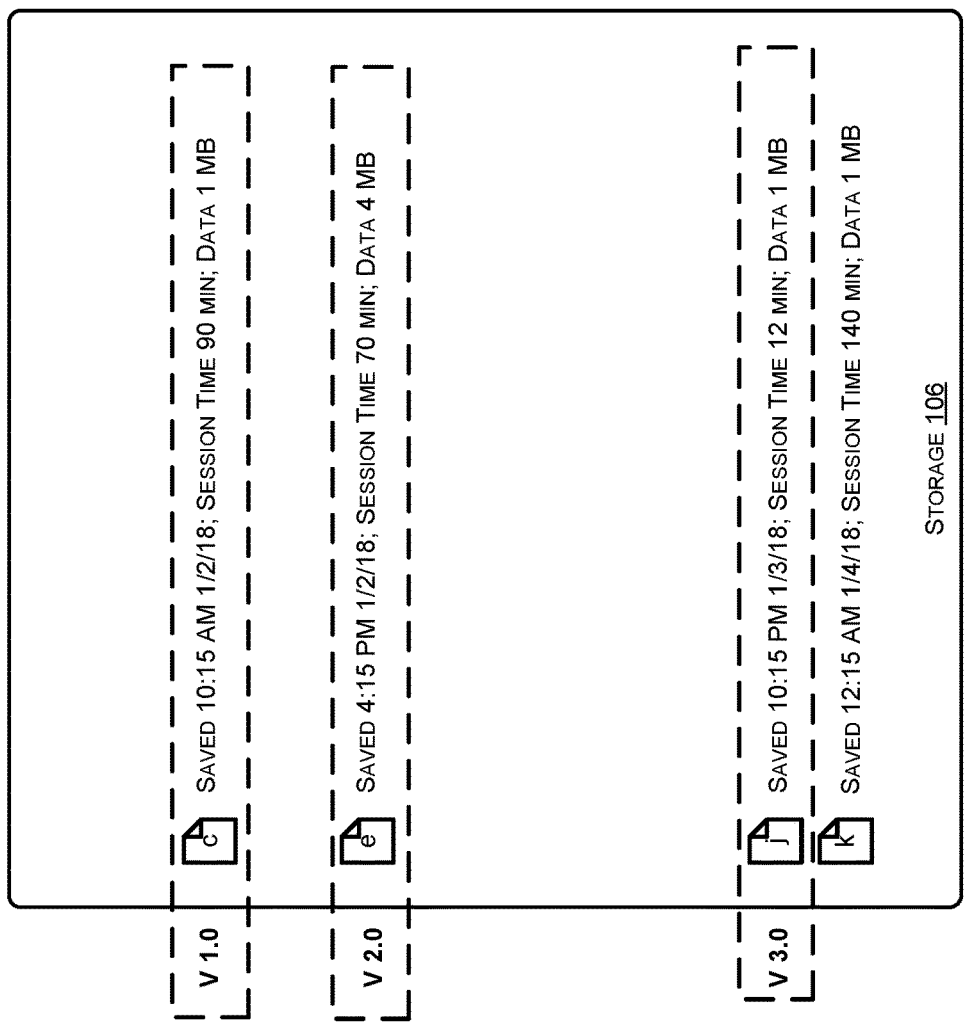
FIG. 3B is a list of file iterations and associated version numbers generated by a system providing smart versioning for files.
Figure 4A:
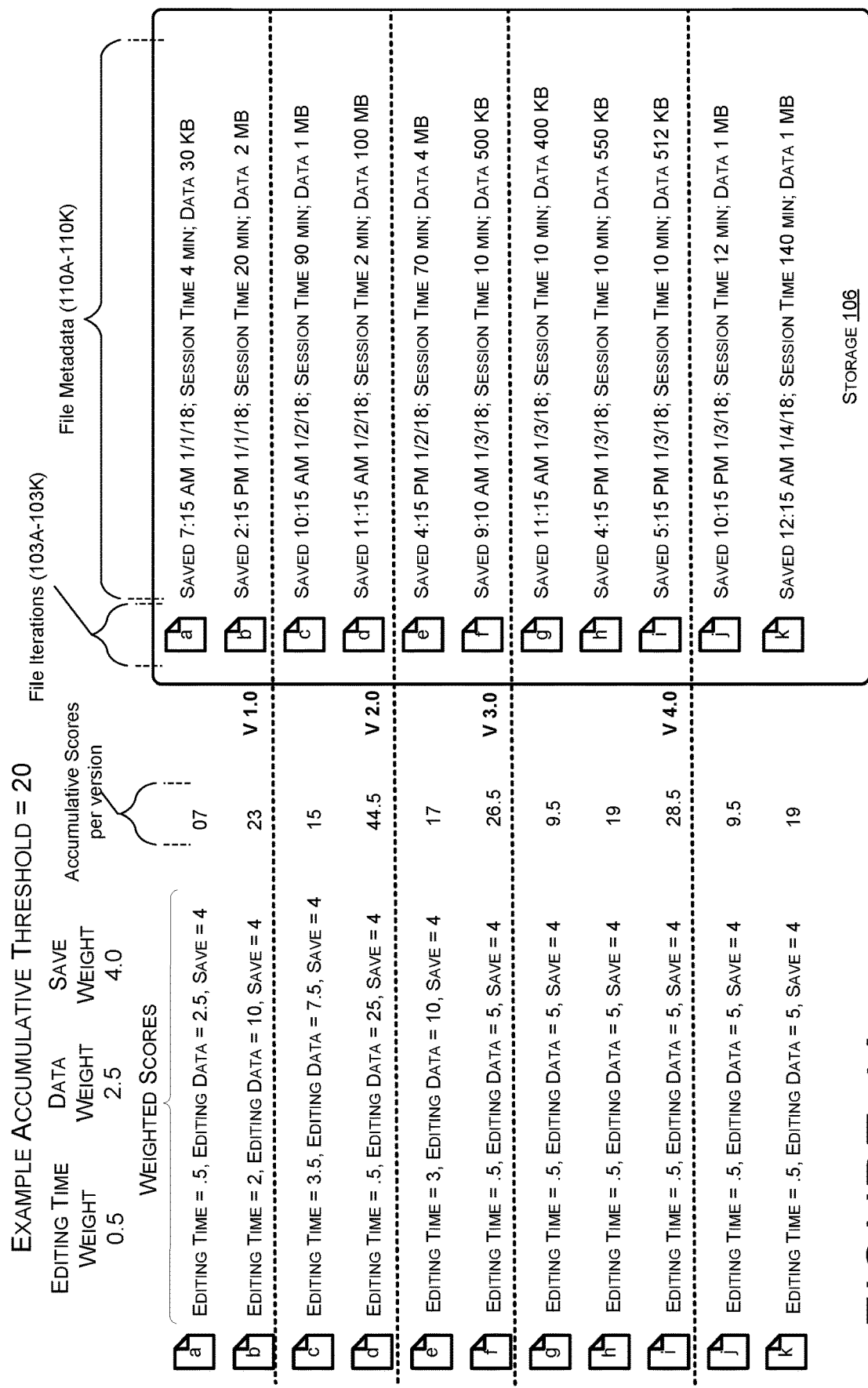
FIG. 4A is a sample data set that shows weighted scores generated by a system providing smart versioning for files.
Figure 4B:
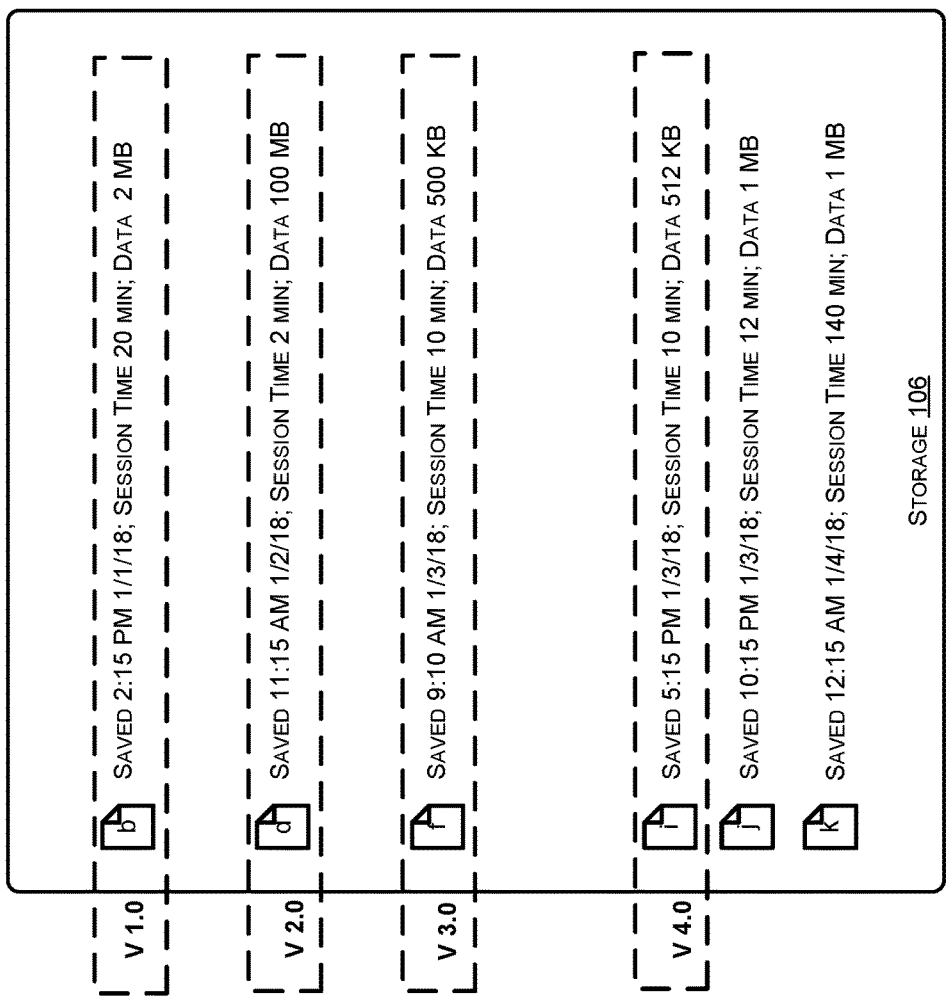
FIG. 4B is another list of file iterations and associated version numbers generated by a system providing smart versioning for files.

To illustrate aspects of the present disclosure, example scenarios are described below and illustrated in three examples depicted in FIGS. 2A-2B, FIGS. 3A-3B, and FIGS. 4A-4B. More specifically, FIGS. 2A-2B illustrate an example system that determines version numbers for a file when a value of one or more attributes reach or exceeds one or more thresholds. FIGS. 3A-3B illustrates an example system that determines version numbers for a file when scores, e.g., normalized scores, of the file attributes reach or exceeds one or more thresholds. FIGS. 4A-4B illustrates an example system that determines version numbers for a file when weighted scores of the file attributes reach or exceeds one or more thresholds.

Referring now to the example data set of FIGS. 2A-2B, the following description illustrates an embodiment that determines version numbers when a value of a file attribute indicating one or more user activities reaches or exceeds a threshold. Consider a scenario where a file 103 is being edited by one or more users. In this example, file metadata associated with each file iteration comprises attributes defining user activity. As each iteration is saved to the storage device 106, the computing device 101 analyzes the metadata to determine when one or more attributes indicate activity that reaches or exceeds a threshold.

For illustrative purposes, a number of thresholds are provided: a first threshold indicating a time limit of 120 minutes, a second threshold indicating a limit of five (5) saves, and a third threshold indicating a limit of 5 megabytes (MB) of editing data. These thresholds and other thresholds disclosed herein are provided for illustrative purposes only and are not to be construed as limiting. It can be appreciated that other thresholds can be utilized with the techniques disclosed herein. In some configurations, the thresholds can vary depending on one or more factors, e.g., different thresholds can be utilized depending on a file type, or different thresholds can be based on a user profile, etc. For instance, a system can use a first set of thresholds for word processing documents, a second set of thresholds for presentation documents, a third set of thresholds for spreadsheet documents, a fourth set of thresholds for image files, etc. Having different thresholds for different file types can increase the accuracy of the version numbers that are generated. For example, when it comes to a threshold defining a limit for editing data, the threshold may be higher for an image file (e.g., many megabytes) than a threshold used for a text file (e.g., a few kilobytes).

With reference to the example illustrated in FIG. 2A, a new version of the document is generated when one or more of the thresholds is reached. As shown, a first version number for the file 103 is generated when the fourth iteration 103D of the file is saved. Specific to the thresholds provided for this example, the first version number of the file is generated in response to determining that 13 MB of edits were applied to the first four iterations (103A-103D) of the file, a quantity of data that exceeds the third threshold of 5 MB. Once a new version number is determined, the metadata of one or more iterations (103A-103D) can be updated to include the version number. In this example, the metadata of the last file that was saved in association with the new version number, the fourth iteration 103D, is updated to indicate the new version number (1.0).

In continuing the present example, the computing device 101 generates another version number after the ninth iteration 103I since the number of saves applied to the file, since the last version number, has reached the second threshold of five (5) saves. In response, the metadata of the last iteration that was saved in association with this new version number, the ninth iteration 103I, is also updated to indicate the new version number (2.0).

Yet further, the computing device 101 generates another version number after the eleventh iteration 103K is saved because the editing time applied to the file, since the last version number, has reached the first threshold, e.g., 120 minutes. In response, the metadata of the last file that was saved in association with this new version number, the eleventh iteration 103K, is updated to indicate the new version number (3.0).

The generated version numbers can be used for a number of purposes. For example, the version numbers can be used to assist users and computers with one or more workflows, assist in managing documents in a publication process, assist in the organization of files in a development environment, etc. In other examples, the version numbers can be used in document management systems and storage systems. In some embodiments, certain iterations of a document can be marked for deletion while other iterations are marked for perpetual storage. For instance, with reference to FIG. 2A, the most recent iteration saved in association with each version can be marked, e.g., flagged, for long-term storage while the other iterations can be marked for short-term storage. These examples are provided for illustrative purposes and are not to be construed as limiting. It can be appreciated that a system can select any subset of iterations associated with a particular version number for a first storage policy. In addition, the system can select other subsets of iterations associated with the particular version number for a second storage policy, where the second storage policy marks the iterations for deletion the purposes of freeing storage space on one or more storage devices. As shown in the example of FIG. 2B, the iterations that are flagged for short-term storage may be deleted after a predetermined period of time. Thus, the system can store fewer iterations while maintaining the storage of content that is selected based on a level of user activity.

Such an embodiment can provide a number of improvements over existing systems, including but not limited to, optimization of storage space, reduced network traffic, reduced utilization of processing power, etc. In addition, the techniques disclosed herein can also improve user interaction with a computing device. By displaying fewer documents to a user and/or marking documents with accurate version numbers, a user is more likely to select and utilize files that are most relevant to a workflow. A display of document iterations only showing iterations that is based on accurate version numbers can improve a user's interaction with a computer and thus reducing the number of inadvertent inputs, a number of incorrectly selected iterations, etc.

FIG. 2C illustrates an example user interface 201 that can be configured according to the version numbers. In this example, some of the iterations are visually highlighted to drawing the user's focus to the salient iterations. In this example, the most recently save iterations of each version number are highlighted, while other iterations are visually obscured. Such a display can draw the user's attention to iterations that are most relevant to a particular workflow. In some embodiments, the user interface 201 may include a filtered list where a subset of the iterations, such as the most recently save iterations for each version (103D, 103I, and 301K), are displayed while the other iterations are remove from the list. A user's interaction with a computer can be improved when a system displays a filtered list that displays iterations that are flagged as a high priority and does not display iterations that are flagged as a low priority.

Referring now to the example of FIGS. 3A-3B, the following description illustrates an embodiment that determines version numbers based on scores 112 that are generated from the file attributes. In some embodiments, the scores 112 can be generated by a process that normalizes the attribute values. This embodiment enables the computing device to compare the various attributes, e.g., compare a quantity of editing data with a quantity of editing time, with a controlled level of accuracy.

In some embodiments, individual scores indicating a value of an attribute can be used to generate an accumulative score, and the accumulative score can be compared against one or more thresholds. A version can be created when the accumulative score reaches one or more thresholds.

In the example of FIG. 3A, the file metadata 110 comprises a number of attributes for each iteration. Each attribute may be analyzed, and a score that provides an indication of each attribute may be generated. Any suitable process, including a normalization process, may be used to analyze the attributes and generate a score. For instance, each quantity of data attribute may be characterized with a score ranging from 1 to 10, and each editing session time may be characterized with a score ranging from 1 to 10. In other implementations, each attribute may be scored with a different range of scores to emphasize certain attributes. For instance, each attribute indicating a quantity of editing data may be characterized with a score ranging from 1 to 50, and each attribute indicating an editing time may be characterized with a score ranging from 1 to 1000. In addition, as described in more detail below, machine learning algorithms may be used to adjust the scores or each range of scores as more iterations and scores are processed by a computing device.

In the example shown in FIG. 3A, an example set of score 112 is provided. In this example, each score for the editing time can be a number from a range of 1 to 10, and each score for the quantity of editing data can be a number from a range of 1 to 10. As shown, for the first iteration, the computing device provides a score of one (1) for an editing time under 10 minutes, a score of two (2) for an editing time between 10 minutes and 15 minutes, etc. Similarly, a score can be generated for the quantity of data that is applied to edits of the document. In this example, a score for the editing data can be a one (1) for a quantity less than 600 KB, a score of two (2) for a quantity of data within the range of 601 KB to 800 KB, a score of three (3) for a quantity of data within the range of 801 KB to 1.5 MB, etc. Also shown, various scores can be generated for various ranges of editing times and various scores can be generated for each save or a number of saves.

These example scores and corresponding ranges are provided for illustrative purposes and are not to be construed as limiting. It can be appreciated that any scoring method, and any range of scores, can apply to the techniques disclosed herein. Further, it can be appreciated that the scores and/or the corresponding ranges can be linear or nonlinear. It can also be appreciated that different sets of scores, and the ranges used to generate the scores, can be different for each file type. For instance, a score for a quantity of editing data can be a one (1) for a quantity less than 10 MB, a score of two (2) for a quantity of data within the range between 10 M to 100 MB, etc. Such an example may be used for other file types, such as image files, etc.

As shown in FIG. 3A, a number of attribute scores 112 can be generated from the analysis of the file metadata 110. In some embodiments, version numbers can be generated when one or more attribute scores reaches the threshold. In another embodiment, as shown in FIG. 3A, the individual attribute scores 112 can be used to determine an accumulative score 113 for each iteration 103. Although this example illustrates one implementation where the scores are added to determine the accumulative score 113, it can be appreciated that the scores can be processed in different ways to determine an accumulative score 113. For instance, the individual scores can be multiplied, summed, or applied to any suitable algorithm for generating an accumulative score 113.

In this example, a version number is generated when the accumulative score 113 reaches a threshold (also referred to herein as an "accumulative threshold"). As shown, the first three iterations of the file cause the generation of a first version number when the accumulative score reaches the accumulative threshold, a second version number is generated when the fourth and fifth iterations reach the accumulative threshold, and a third version number is generated when the sixth iteration 103F through the tenth iteration 103J reach the accumulative threshold. As shown, in some embodiments, the accumulative score can be reset each time a version number is generated. The accumulative score of the eleventh iteration 103K does not reach the accumulative threshold, thus this iteration does not cause a generation of a new version number. Thus, the eleventh iteration 103K is not associated with a version number.

As summarized above, one or more actions can result once the version numbers are generated. The example of FIG. 3B shows one example that can result from the version numbers generated in the example of FIG. 3A. In this example, the most recently saved iteration associated with each version number is marked for long-term storage while the other iterations are marked for short-term storage. In this example, system retains the iterations marked for long-term storage, and deletes the iterations marked for short-term storage. In some embodiments, the system may retain any iteration that is not associated with the version number. In this example, the iteration that was most recently saved, the eleventh iteration 103K, is also maintained in storage 106.

Referring now to the example of FIGS. 4A-4B, the following description illustrates an embodiment that applies weighted values to the scores or attribute values to emphasize or deemphasize certain types of user activities. As summarized above, such embodiments can provide file version numbers that are optimized for a particular workflow or specific types of files.

For illustrative purposes, example weights are provided: a first weight (an editing time weight) is 0.5; a second weight (an editing data weight) is 2.5; and a third weight (a save weight) is 4.0. Such weights are used to deemphasize user activity pertaining to editing time and emphasize user activity pertaining to editing activity and a number of saves. These weights are provided for illustrative purposes and are not to be construed as limiting. It can be appreciated that other weights can be used depending on a file type, an applicable workflow, usage patterns of one or more users, an applied machine learning algorithm, etc.

To illustrate aspects of this embodiment, the sample weights are applied to the scores shown in FIG. 3A. FIG. 4A illustrates the weighted scores for each iteration. As shown, the scores for each editing time are reduced according to the first weight, while the scores for the editing data and the saves are increased according to the second weight and third weight. Also shown, the weighted scores are used to generate an accumulative score, which is reset each time a version number is generated. In this example, a version number is generated when each accumulative score reaches the threshold.

Similar to the previous examples, one more actions can be taken based on the file version numbers. FIG. 4B illustrates iterations that may be displayed and/or stored once the iterations are marked in association with one or more generated version numbers. In this example, the system can retain and display the most recent iteration of each version number. In addition, the system can retain and display iterations that are not associated with a version number. In this example, the last two iterations, e.g., the tenth 103J iteration and the eleventh 103K iteration, are not yet associated with the version number, and thus these iterations are maintained in the storage 106.

A summarized above, one or more techniques, including machine learning algorithms, may be used to adjust the scores, weighted scores and/or thresholds as iterations are processed by a computing device. For example, a linear regression mechanism may be used to generate a score, weighted score, or threshold. Linear regression may refer to a process for modeling the relationship between one attribute of an iteration with one or more other attributes. Different linear regression models might be used to calculate a score, weight, or threshold. For example, a least squares approach might be utilized, a maximum-likelihood estimation might be utilized, or another approach might be utilized. The linear models may be simple linear models (e.g., a single predictor variable and a single scalar response variable) or may be multiple regression models (e.g., multiple predictors). The models might also be general linear models, heteroscedastic models, generalized linear models (e.g., Poisson regression, logistic regression, or multinomial logistic regression), Bayesian linear regression, quantile regression, and the like.

Figure 5:
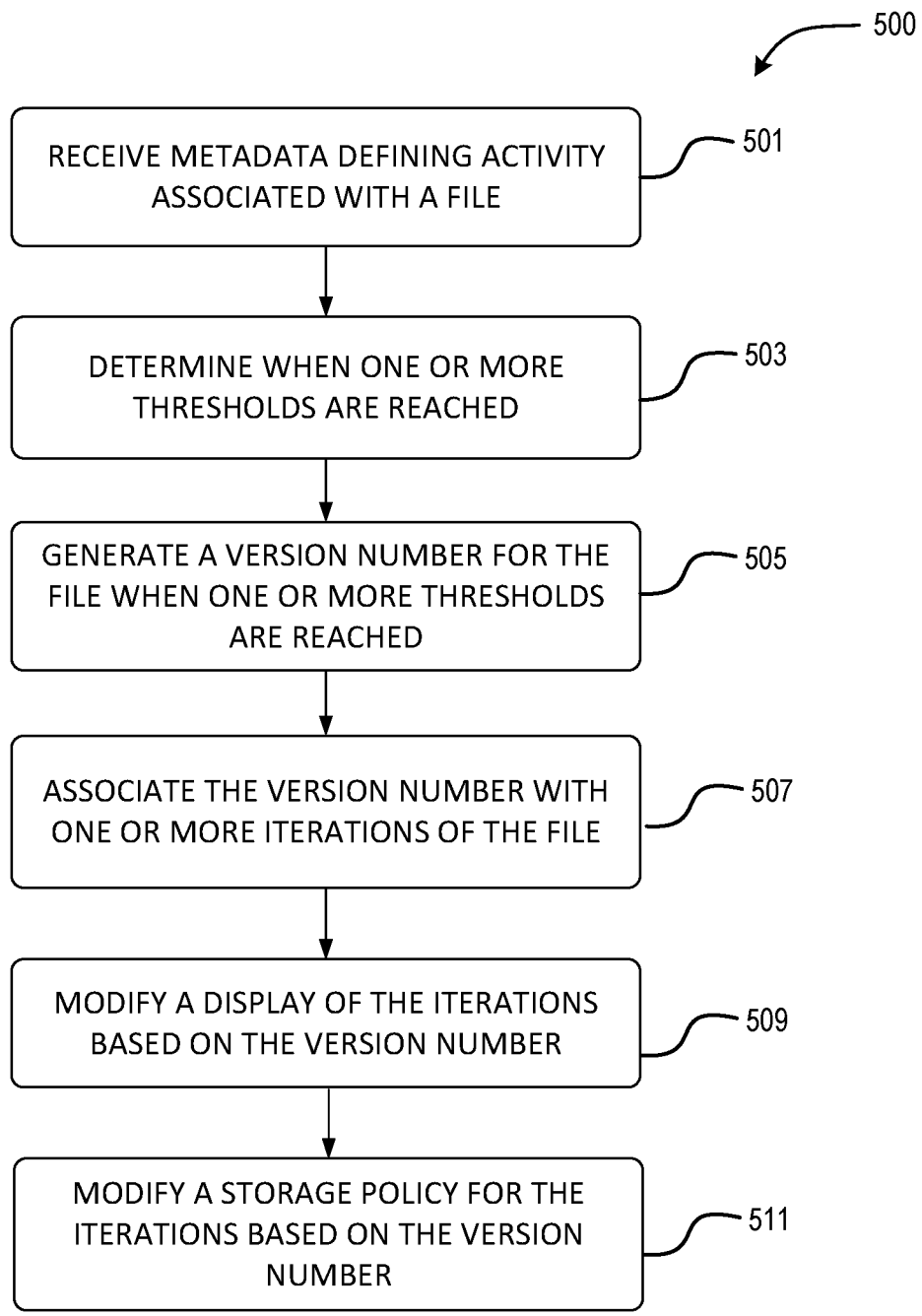
FIG. 5 is a flow diagram showing aspects of a routine for enabling the techniques disclosed herein.

Turning now to FIG. 5, aspects of a routine 500 for enabling smart versioning of files are shown and described below. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 500 are described herein as being implemented, at least in part, by modules running the features disclosed herein can be a dynamically linked library (DLL), a statically linked library, functionality produced by an application programming interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it can be appreciated that the operations of the routine 500 may be also implemented in many other ways. For example, the routine 500 may be implemented, at least in part, by a processor of another remote computer or a local circuit. In addition, one or more of the operations of the routine 500 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 5, the routine 500 begins at operation 501 where one or more modules of a computing system receive metadata defining user activity associated with a file. The metadata can comprise any type data defining user activity or activity that is applied to a file, including but not limited to, an amount of time a user or computer has spent editing a file, a number of saves that have occurred, and/or a quantity of data applied to edits of the file.

Next, at operation 503, one or more modules of a computing system can determine when one or more thresholds are reached. For instance, a computing system can determine, for one or more iterations of the file, when at least one of the quantity of data applied to the edits of the file, the number of saves applied to the file, or the amount of time applied to edits of the file reaches one or more thresholds. The thresholds can vary based on a file type or based on one or more applications of the version numbers. In addition, scores, weighted scores, and/or weights can be applied to each attribute, such as but not limited to, the quantity of data applied to the edits of the file, the number of saves applied to the file, or the amount of time applied to edits of the file.

Next, at operation 505, one or more modules of a computing system can generate a version number for the file when the one or more thresholds are reached. The version numbers can be in any format and include any type of text character, image, encoding, or marking. Next, at operation 507, one or more modules of a computing device can associate the version number with the one or more iterations of the file.

Next, at operation 509, one or more modules of a computing device can modify a display of the iterations based on the version number. As summarized above, and shown in FIG. 2C, a list can be filtered and configured to only display certain iterations of a file, such as the most recently saved iteration. At the same time, the list can be filtered, and certain iterations may not be displayed, such as iterations that have reached a predetermined age.

Next, at operation 511, or more modules of a computing device can modify a storage policy for the iterations based on the version number. As summarized above, some iterations may be marked for long-term storage, e.g., a first storage policy, and other iterations can be marked for short-term storage, e.g., a second storage policy. The iterations may be automatically removed from a system based on the policies for the purposes of preserving storage space on system.

FIG. 6 shows additional details of an example computer architecture 600 for a computer, such as the computing device 106 (FIG. 1), capable of executing the program components described herein. Thus, the computer architecture 600 illustrated in FIG. 6 illustrates an architecture for a server computer, a mobile phone, a PDA, a smart phone, a desktop computer, a netbook computer, a tablet computer, and/or a laptop computer. The computer architecture 600 may be utilized to execute any aspects of the software components presented herein.

The computer architecture 600 illustrated in FIG. 6 includes a central processing unit 602 ("CPU"), a system memory 604, including a random-access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing an operating system 607, other data, and one or more applications 102, such as a productivity application.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes of the claims, the phrase "computer storage medium," "computer-readable storage medium" and variations thereof, does not include waves, signals, and/or other transitory and/or intangible communication media, per se.

According to various configurations, the computer architecture 600 may operate in a networked environment using logical connections to remote computers through the network 656 and/or another network (not shown). The computer architecture 600 may connect to the network 656 through a network interface unit 614 connected to the bus

610. It should be appreciated that the network interface unit 614 also may be utilized to connect to other types of networks and remote computer systems. The computer architecture 600 also may include an input/output controller 616 for receiving and processing input from a number of other devices, including a keyboard, mouse, or electronic stylus (not shown in FIG. 6). Similarly, the input/output controller 616 may provide output to a display screen, a printer, or other type of output device (also not shown in FIG. 6).

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

FIG. 7 depicts an illustrative distributed computing environment 700 capable of executing the software components described herein. Thus, the distributed computing environment 700 illustrated in FIG. 7 can be utilized to execute any aspects of the software components presented herein. For example, the distributed computing environment 700 can be utilized to execute aspects of the software components described herein.

According to various implementations, the distributed computing environment 700 includes a computing environment 702 operating on, in communication with, or as part of the network 704. The network 704 may be or may include the network 656, described above with reference to FIG. 6. The network 704 also can include various access networks. One or more client devices 706A-706N (hereinafter referred to collectively and/or generically as "clients 706" and also referred to herein as computing devices 106) can communicate with the computing environment 702 via the network 704 and/or other connections (not illustrated in FIG. 7). In one illustrated configuration, the clients 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of clients 706 can communicate with the computing environment 702. Two example computing architectures for the clients 706 are illustrated and described herein with reference to FIGS. 5 and 7. It should be understood that the illustrated clients 706 and computing architectures illustrated and described herein are illustrative, and should not be construed as being limited in any way.

In the illustrated configuration, the computing environment 702 includes application servers 708, data storage 710, and one or more network interfaces 712. According to various implementations, the functionality of the application servers 708 can be provided by one or more server computers that are executing as part of, or in communication with, the network 704. The application servers 708 can host various services, virtual machines, portals, and/or other resources. In the illustrated configuration, the application servers 708 host one or more virtual machines 714 for hosting applications or other functionality. According to various implementations, the virtual machines 714 host one or more applications and/or software modules for enabling smart versioning of files. It should be understood that this configuration is illustrative, and should not be construed as being limiting in any way. The application servers 708 also host or provide access to one or more portals, link pages, Web sites, and/or other information ("Web portals") 716.

According to various implementations, the application servers 708 also include one or more mailbox services 718 and one or more messaging services 720. The mailbox services 718 can include electronic mail ("email") services. The mailbox services 718 also can include various personal information management ("PIM") and presence services including, but not limited to, calendar services, contact management services, collaboration services, and/or other services. The messaging services 720 can include, but are not limited to, instant messaging services, chat services, forum services, and/or other communication services.

The application servers 708 also may include one or more social networking services 722. The social networking services 722 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 722 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 722 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 722 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 722 are not mentioned herein for the sake of brevity. As such, the above configurations are illustrative, and should not be construed as being limited in any way. According to various implementations, the social networking services 722 may host one or more applications and/or software modules for providing the functionality described herein, such as enabling smart versioning of files. For instance, any one of the application servers 708 may communicate or facilitate the functionality and features described herein. For instance, a social networking application, mail client, messaging client or a browser running on a phone or any other client 706 may communicate with a networking service 722 and facilitate the functionality, even in part, described above with respect to FIG. 7. Any device or service depicted herein can be used as a resource for supplemental data, including email servers, storage servers, etc.

As shown in FIG. 7, the application servers 708 also can host other services, applications, portals, and/or other resources ("other resources") 724. The other resources 724 can include, but are not limited to, document sharing, rendering or any other functionality. It thus can be appreciated that the computing environment 702 can provide integration of the concepts and technologies disclosed herein with various mailbox, messaging, social networking, and/or other services or resources.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more server computers configured to host data for the computing environment 702. The data storage 710 can include, host, or provide one or more real or virtual datastores 726A-726N (hereinafter referred to collectively and/or generically as "datastores 726"). The datastores 726 are configured to host data used or created by the application servers 708 and/or other data. Although not illustrated in FIG. 7, the datastores 726 also can host or store web page documents, word documents, presentation documents, data structures, algorithms for execution by a recommendation engine, and/or other data utilized by any application program or another module. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including, but not limited to, the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects. In one specific example, as summarized above, techniques described herein may be implemented, at least in part, by web browser application, which works in conjunction with the application servers 708 of FIG. 7.

Turning now to FIG. 8, an illustrative computing device architecture 800 for a computing device that is capable of executing various software components described herein for enabling smart versioning of files. The computing device architecture 800 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 800 is applicable to any of the computing devices shown in FIG. 1 and FIG. 7. Moreover, aspects of the computing device architecture 800 may be applicable to traditional desktop computers, portable computers (e.g., phones, laptops, notebooks, ultra-portables, and netbooks), server computers, and other computer systems, such as described herein with reference to FIG. 1 and FIG. 7. For example, the single touch and multi-touch aspects disclosed herein below may be applied to desktop computers that utilize a touchscreen or some other touch-enabled device, such as a touch-enabled track pad or touch-enabled mouse.

The computing device architecture 800 illustrated in FIG. 8 includes a processor 802, memory components 804, network connectivity components 806, sensor components 808, input/output components 810, and power components 812. In the illustrated configuration, the processor 802 is in communication with the memory components 804, the network connectivity components 806, the sensor components 808, the input/output ("I/O") components 810, and the power components 812. Although no connections are shown between the individuals components illustrated in FIG. 8, the components can interact to carry out device functions. In some configurations, the components are arranged so as to communicate via one or more busses (not shown).

The processor 802 includes a central processing unit ("CPU") configured to process data, execute computer-executable instructions of one or more application programs, and communicate with other components of the computing device architecture 800 in order to perform various functionality described herein. The processor 802 may be utilized to execute aspects of the software components presented herein and, particularly, those that utilize, at least in part, a touch-enabled input.

In some configurations, the processor 802 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 802 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 802 is, or is included in, a system-on-chip ("SoC") along with one or more of the other components described herein below. For example, the SoC may include the processor 802, a GPU, one or more of the network connectivity components 806, and one or more of the sensor components 808. In some configurations, the processor 802 is fabricated, in part, utilizing a package-on-package ("PoP") integrated circuit packaging technique. The processor 802 may be a single core or multi-core processor.

The processor 802 may be created in accordance with an ARM architecture, available for license from ARM HOLDINGS of Cambridge, United Kingdom. Alternatively, the processor 802 may be created in accordance with an x86 architecture, such as is available from INTEL CORPORATION of Mountain View, Calif. and others. In some configurations, the processor 802 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 804 include a random access memory ("RAM") 814, a read-only memory ("ROM") 816, an integrated storage memory ("integrated storage") 818, and a removable storage memory ("removable storage") 820. In some configurations, the RAM 814 or a portion thereof, the ROM 816 or a portion thereof, and/or some combination of the RAM 814 and the ROM 816 is integrated in the processor 802. In some configurations, the ROM 816 is configured to store a firmware, an operating system or a portion thereof (e.g., operating system kernel), and/or a bootloader to load an operating system kernel from the integrated storage 818 and/or the removable storage 820.

The integrated storage 818 can include a solid-state memory, a hard disk, or a combination of solid-state memory and a hard disk. The integrated storage 818 may be soldered or otherwise connected to a logic board upon which the processor 802 and other components described herein also may be connected. As such, the integrated storage 818 is integrated in the computing device. The integrated storage 818 is configured to store an operating system or portions thereof, application programs, data, and other software components described herein.

The removable storage 820 can include a solid-state memory, a hard disk, or a combination of solid-state memory and a hard disk. In some configurations, the removable storage 820 is provided in lieu of the integrated storage 818. In other configurations, the removable storage 820 is provided as additional optional storage. In some configurations, the removable storage 820 is logically combined with the integrated storage 818 such that the total available storage is made available as a total combined storage capacity. In some configurations, the total combined capacity of the integrated storage 818 and the removable storage 820 is shown to a user instead of separate storage capacities for the integrated storage 818 and the removable storage 820.

The removable storage 820 is configured to be inserted into a removable storage memory slot (not shown) or other mechanism by which the removable storage 820 is inserted and secured to facilitate a connection over which the removable storage 820 can communicate with other components of the computing device, such as the processor 802. The removable storage 820 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 804 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 806 include a wireless wide area network component ("WWAN component") 822, a wireless local area network component ("WLAN component") 824, and a wireless personal area network component ("WPAN component") 826. The network connectivity components 806 facilitate communications to and from the network 856 or another network, which may be a WWAN, a WLAN, or a WPAN. Although only the network 856 is illustrated, the network connectivity components 806 may facilitate simultaneous communication with multiple networks, including the network 604 of FIG. 6. For example, the network connectivity components 806 may facilitate simultaneous communications with multiple networks via one or more of a WWAN, a WLAN, or a WPAN.

The network 856 may be or may include a WWAN, such as a mobile telecommunications network utilizing one or more mobile telecommunications technologies to provide voice and/or data services to a computing device utilizing the computing device architecture 800 via the WWAN component 822. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 856 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 856 may be configured to provide voice and/or data communications with any combination of the above technologies. The network 856 may be configured to or adapted to provide voice and/or data communications in accordance with future generation technologies.

In some configurations, the WWAN component 822 is configured to provide dual-multi-mode connectivity to the network 856. For example, the WWAN component 822 may be configured to provide connectivity to the network 856, wherein the network 856 provides service via GSM and UMTS technologies, or via some other combination of technologies. Alternatively, multiple WWAN components 822 may be utilized to perform such functionality, and/or provide additional functionality to support other non-compatible technologies (i.e., incapable of being supported by a single WWAN component). The WWAN component 822 may facilitate similar connectivity to multiple networks (e.g., a UMTS network and an LTE network).

The network 856 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 824 is configured to connect to the network 856 via the WI-FI access points. Such connections may be secured via various encryption technologies including, but not limited, WI-FI Protected Access ("WPA"), WPA2, Wired Equivalent Privacy ("WEP"), and the like.

The network 856 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 826 is configured to facilitate communications with other devices, such as peripherals, computers, or other computing devices via the WPAN.

The sensor components 808 include a magnetometer 828, an ambient light sensor 830, a proximity sensor 832, an accelerometer 834, a gyroscope 836, and a Global Positioning System sensor ("GPS sensor") 838. It is contemplated that other sensors, such as, but not limited to, temperature sensors or shock detection sensors, also may be incorporated in the computing device architecture 800.

The magnetometer 828 is configured to measure the strength and direction of a magnetic field. In some configurations the magnetometer 828 provides measurements to a compass application program stored within one of the memory components 804 in order to provide a user with accurate directions in a frame of reference including the cardinal directions, north, south, east, and west. Similar measurements may be provided to a navigation application program that includes a compass component. Other uses of measurements obtained by the magnetometer 828 are contemplated.

The ambient light sensor 830 is configured to measure ambient light. In some configurations, the ambient light sensor 830 provides measurements to an application program stored within one the memory components 804 in order to automatically adjust the brightness of a display (described below) to compensate for low-light and high-light environments. Other uses of measurements obtained by the ambient light sensor 830 are contemplated.

The proximity sensor 832 is configured to detect the presence of an object or thing in proximity to the computing device without direct contact. In some configurations, the proximity sensor 832 detects the presence of a user's body (e.g., the user's face) and provides this information to an application program stored within one of the memory components 804 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 832 are contemplated.

The accelerometer 834 is configured to measure proper acceleration. In some configurations, output from the accelerometer 834 is used by an application program as an input mechanism to control some functionality of the application program. For example, the application program may be a video game in which a character, a portion thereof, or an object is moved or otherwise manipulated in response to input received via the accelerometer 834. In some configurations, output from the accelerometer 834 is provided to an application program for use in switching between landscape and portrait modes, calculating coordinate acceleration, or detecting a fall. Other uses of the accelerometer 834 are contemplated.

The gyroscope 836 is configured to measure and maintain orientation. In some configurations, output from the gyroscope 836 is used by an application program as an input mechanism to control some functionality of the application program. For example, the gyroscope 836 can be used for accurate recognition of movement within a 3D environment of a video game application or some other application. In some configurations, an application program utilizes output from the gyroscope 836 and the accelerometer 834 to enhance control of some functionality of the application program. Other uses of the gyroscope 836 are contemplated.

The GPS sensor 838 is configured to receive signals from GPS satellites for use in calculating a location. The location calculated by the GPS sensor 838 may be used by any application program that requires or benefits from location information. For example, the location calculated by the GPS sensor 838 may be used with a navigation application program to provide directions from the location to a destination or directions from the destination to the location. Moreover, the GPS sensor 838 may be used to provide location information to an external location-based service, such as E911 service. The GPS sensor 838 may obtain location information generated via WI-FI, WIMAX, and/or cellular triangulation techniques utilizing one or more of the network connectivity components 806 to aid the GPS sensor 838 in obtaining a location fix. The GPS sensor 838 may also be used in Assisted GPS ("A-GPS") systems. The GPS sensor 838 can also operate in conjunction with other components, such as the processor 802, to generate positioning data for the computing device 800.

The I/O components 810 include a display 840, a touchscreen 842, a data I/O interface component ("data I/O") 844, an audio I/O interface component ("audio I/O") 846, a video I/O interface component ("video I/O") 848, and a camera 850. In some configurations, the display 840 and the touchscreen 842 are combined. In some configurations two or more of the data I/O component 844, the audio I/O component 846, and the video I/O component 848 are combined. The I/O components 810 may include discrete processors configured to support the various interface described below, or may include processing functionality built-in to the processor 802.

The display 840 is an output device configured to present information in a visual form. In particular, the display 840 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 840 is a liquid crystal display ("LCD") utilizing any active or passive matrix technology and any backlighting technology (if used). In some configurations, the display 840 is an organic light emitting diode ("OLED") display. Other display types are contemplated.

The touchscreen 842, also referred to herein as a "touch-enabled screen," is an input device configured to detect the presence and location of a touch. The touchscreen 842 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 842 is incorporated on top of the display 840 as a transparent layer to enable a user to use one or more touches to interact with objects or other information presented on the display 840. In other configurations, the touchscreen 842 is a touch pad incorporated on a surface of the computing device that does not include the display 840. For example, the computing device may have a touchscreen incorporated on top of the display 840 and a touch pad on a surface opposite the display 840.

In some configurations, the touchscreen 842 is a single-touch touchscreen. In other configurations, the touchscreen 842 is a multi-touch touchscreen. In some configurations, the touchscreen 842 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 842. As such, a developer may create gestures that are specific to a particular application program.

In some configurations, the touchscreen 842 supports a tap gesture in which a user taps the touchscreen 842 once on an item presented on the display 840. The tap gesture may be used for various reasons including, but not limited to, opening or launching whatever the user taps. In some configurations, the touchscreen 842 supports a double tap gesture in which a user taps the touchscreen 842 twice on an item presented on the display 840. The double tap gesture may be used for various reasons including, but not limited to, zooming in or zooming out in stages. In some configurations, the touchscreen 842 supports a tap and hold gesture in which a user taps the touchscreen 842 and maintains contact for at least a pre-defined time. The tap and hold gesture may be used for various reasons including, but not limited to, opening a context-specific menu.

In some configurations, the touchscreen 842 supports a pan gesture in which a user places a finger on the touchscreen 842 and maintains contact with the touchscreen 842 while moving the finger on the touchscreen 842. The pan gesture may be used for various reasons including, but not limited to, moving through screens, images, or menus at a controlled rate. Multiple finger pan gestures are also contemplated. In some configurations, the touchscreen 842 supports a flick gesture in which a user swipes a finger in the direction the user wants the screen to move. The flick gesture may be used for various reasons including, but not limited to, scrolling horizontally or vertically through menus or pages. In some configurations, the touchscreen 842 supports a pinch and stretch gesture in which a user makes a pinching motion with two fingers (e.g., thumb and forefinger) on the touchscreen 842 or moves the two fingers apart. The pinch and stretch gesture may be used for various reasons including, but not limited to, zooming gradually in or out of a web site, map, or picture.

Although the above gestures have been described with reference to the use of one or more fingers for performing the gestures, other appendages such as toes or objects such as styluses may be used to interact with the touchscreen 842. As such, the above gestures should be understood as being illustrative and should not be construed as being limiting in any way.

The data I/O interface component 844 is configured to facilitate input of data to the computing device and output of data from the computing device. In some configurations, the data I/O interface component 844 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 846 is configured to provide audio input and/or output capabilities to the computing device. In some configurations, the audio I/O interface component 846 includes a microphone configured to collect audio signals. In some configurations, the audio I/O interface component 846 includes a headphone jack configured to provide connectivity for headphones or other external speakers. In some configurations, the audio I/O interface component 846 includes a speaker for the output of audio signals. In some configurations, the audio I/O interface component 846 includes an optical audio cable out.

The video I/O interface component 848 is configured to provide video input and/or output capabilities to the computing device. In some configurations, the video I/O interface component 848 includes a video connector configured to receive video as input from another device (e.g., a video media player such as a DVD or BLURAY player) or send video as output to another device (e.g., a monitor, a television, or some other external display). In some configurations, the video I/O interface component 848 includes a High-Definition Multimedia Interface ("HDMI"), mini-HDMI, micro-HDMI, DisplayPort, or proprietary connector to input/output video content. In some configurations, the video I/O interface component 848 or portions thereof is combined with the audio I/O interface component 846 or portions thereof.

The camera 850 can be configured to capture still images and/or video. The camera 850 may utilize a charge coupled device ("CCD") or a complementary metal oxide semiconductor ("CMOS") image sensor to capture images. In some configurations, the camera 850 includes a flash to aid in taking pictures in low-light environments. Settings for the camera 850 may be implemented as hardware or software buttons.

Although not illustrated, one or more hardware buttons may also be included in the computing device architecture 800. The hardware buttons may be used for controlling some operational aspect of the computing device. The hardware buttons may be dedicated buttons or multi-use buttons. The hardware buttons may be mechanical or sensor-based.

The illustrated power components 812 include one or more batteries 852, which can be connected to a battery gauge 854. The batteries 852 may be rechargeable or disposable. Rechargeable battery types include, but are not limited to, lithium polymer, lithium ion, nickel cadmium, and nickel metal hydride. Each of the batteries 852 may be made of one or more cells.

The battery gauge 854 can be configured to measure battery parameters such as current, voltage, and temperature. In some configurations, the battery gauge 854 is configured to measure the effect of a battery's discharge rate, temperature, age and other factors to predict remaining life within a certain percentage of error. In some configurations, the battery gauge 854 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 812 may also include a power connector, which may be combined with one or more of the aforementioned I/O components 810. The power components 812 may interface with an external power system or charging equipment via an I/O component.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method for determining a version number for a file based on user activity comprising:
  receiving metadata defining user activity associated with the file, the metadata defining at least one of a quantity of data applied to edits of the file, a number of saves applied to the file, or an amount of time applied to edits of the file;
  determining one or more weights based on at least two of the quantity of data applied to edits of the file, the number of saves applied to the file, or the amount of time applied to edits of the file to emphasize or deemphasize a type of user activity, wherein the one or more weights are determined based on one or more previous iterations of the file;
  generating one or more thresholds based on applying the one or more weights to at least two of the quantity of data applied to the edits of the file, the number of saves applied to the file, or the amount of time applied to edits of the one or more previous iterations of the file;
  determining, for one or more iterations of the file, that at least one of the quantity of data applied to the edits of the file, the number of saves applied to the file, or the amount of time applied to edits of the file reaches the one or more thresholds, wherein the one or more weights are applied to emphasize or deemphasize a type of user activity;
  in response to determining, for the one or more iterations of the file, that at least one of the quantity of data applied to the edits of the file, the number of saves applied to the file, or the amount of time applied to edits of the file reaches the one or more thresholds, determining the version number for the one or more iterations of the file; and
  associating the version number with the one or more iterations of the file.

2. The method of claim 1, further comprising:
  selecting a first subset of iterations of the one or more iterations of the file for a first storage policy, wherein the first subset includes a most recently saved iteration associated with the version number; and
  selecting a second subset of iterations of the one or more iterations of the file for a second storage policy, wherein the second subset of iterations is marked for deletion the purposes of freeing storage space on one or more storage devices.

3. The method of claim 1, further comprising:
  selecting a first subset of iterations of the one or more iterations of the file, wherein the first subset includes a most recently saved iteration associated with the version number;
  selecting a second subset of iterations of the one or more iterations of the file; and
  displaying a list of iterations that includes the first subset of iterations, wherein the second subset of iterations is displayed as graphical objects or text that is visually obscured or omitted from the list of iterations.

4. The method of claim 1, further comprising:
  generating a number of scores based on the quantity of data, the number of saves, and the amount of time; and
  generating an accumulative score from the number of scores, wherein determining that at least one of the quantity of data, the number of saves, or the amount of time reaches the one or more thresholds comprises determining that the accumulative score reaches the one or more thresholds, and wherein the version number is determined in response to determining that the accumulative score reaches the one or more thresholds.

5. The method of claim 1, wherein the one or more weights comprise a numerical coefficient.

6. The method of claim 1, wherein the one or more weights are determined according to at least one of a file type, a usage pattern of one or more users, and an applied machine learning algorithm.

7. The method of claim 1, wherein the one or more thresholds are based on a user profile.

8. The method of claim 1 wherein, the one or more weights are increased or decreased when a statistical model applied to the one or more previous iterations of the file indicates a changed relationship between one or more attributes of the file, the one or more attributes comprising the quantity of data applied to the edits of the file, the number of saves applied to the file, or the amount of time applied to edits of the file.

9. The method of claim 1, wherein the one or more weights are increased or decreased in response to an analysis of telemetry data retrieved from the one or more previous iterations of the file.

10. The method of claim 1, wherein the one or more thresholds are increased or decreased in response to an analysis of telemetry data retrieved from the one or more previous iterations of the file.

11. The method of claim 1 further comprising:
determining, for one or more iterations of the file, that at least two of the quantity of data applied to the edits of the file, the number of saves applied to the file, or the amount of time applied to edits of the file reaches one or more thresholds;
in response to determining that at least two of the quantity of data applied to the edits of the file, the number of saves applied to the file, or the amount of time applied to edits of the file reaches one or more thresholds, determining the version number for the one or more iterations of the file; and
associating the version number with the one or more iterations of the file.

12. A system for determining a version number for a file based on user activity comprising:
one or more processing units; and
a computer-readable medium having encoded thereon computer-executable instructions to cause the one or more processing units to execute a method comprising:
receiving metadata defining user activity associated with the file, the metadata defining at least one of a quantity of data applied to edits of the file, a number of saves applied to the file, or an amount of time applied to edits of the file;
determining one or more weights based on at least two of the quantity of data applied to edits of the file, the number of saves applied to the file, or the amount of time applied to edits of the file to emphasize or deemphasize a type of user activity, wherein the one or more weights are determined based on one or more previous iterations of the file;
generating one or more thresholds based on applying the one or more weights to at least two of the quantity of data applied to the edits of the file, the number of saves applied to the file, or the amount of time applied to edits of the one or more previous iterations of the file;
determining, for one or more iterations of the file, that at least one of the quantity of data applied to the edits of the file, the number of saves applied to the file, or the amount of time applied to edits of the file exceeds the one or more thresholds, wherein the one or more weights are applied to or deemphasize a type of user activity;
in response to determining that at least one of the quantity of data applied to the edits of the file, the number of saves applied to the file, or the amount of time applied to edits of the file exceeds the one or more thresholds, determining the version number for the one or more iterations of the file;
associating the version number with the one or more iterations of the file;
selecting a first subset of iterations of the one or more iterations of the file, wherein the first subset includes a most recently saved iteration; and
selecting a second subset of iterations of the one or more iterations of the file for short-term storage, wherein the second subset of iterations is marked for deletion the purposes of freeing storage space on one or more storage devices.

13. The system of claim 12, wherein the method further comprises displaying a list of iterations that includes the first subset of iterations, wherein the second subset of iterations is displayed as visually obscured graphical elements, or the second subset of iterations is filtered from the list of iterations.

14. The system of claim 12, wherein the one or more thresholds are based on a type of file.

15. The system of claim 12, wherein the method further comprises:
generating a number of scores based on the quantity of data, the number of saves, and the amount of time; and
generating an accumulative score from the number of scores, wherein determining that at least one of the quantity of data, the number of saves, or the amount of time reaches the one or more thresholds comprises determining that the accumulative score reaches the one or more thresholds, and wherein the version number is determined in response to determining that the accumulative score reaches the one or more thresholds.

16. A computer-readable medium having encoded thereon computer-executable instructions to cause one or more processing units of a computing device to execute a method for determining a version number for a file based on user activity comprising:
receiving metadata defining at least one measure of user activity associated with the file;
determining one or more weights based on at least two of the quantity of data applied to edits of the file, the number of saves applied to the file, or the amount of time applied to edits of the file to emphasize or deemphasize a type of user activity, wherein the one or more weights are determined based on one or more previous iterations of the file;
generating one or more thresholds based on applying the one or more weights to at least two of the quantity of data applied to the edits of the file, the number of saves applied to the file, or the amount of time applied to edits of the one or more previous iterations of the file;
determining, for one or more iterations of the file, that the at least one measure of user activity reaches the one or more thresholds, wherein the one or more weights are applied to emphasize or deemphasize a type of user activity;
in response to determining, for the one or more iterations of the file, that the at least one measure of user activity reaches the one or more thresholds, determining the version number for the one or more iterations of the file; and associating the version number with the one or more iterations of the file.

17. The computer-readable medium of claim 16, wherein the method further comprises:

selecting a first subset of iterations of the one or more iterations of the file for a first storage policy, wherein the first subset includes a most recently saved iteration associated with the version number; and selecting a second subset of iterations of the one or more iterations of the file for a second storage policy, wherein the second subset of iterations is marked for deletion the purposes of freeing storage space on one or more storage devices.

18. The computer-readable medium of claim 16, wherein the method further comprises:

selecting a first subset of iterations of the one or more iterations of the file, wherein the first subset includes a most recently saved iteration associated with the version number;

selecting a second subset of iterations of the one or more iterations of the file; and displaying a list of iterations that includes the first subset of iterations, wherein the second subset of iterations is visually obscured or filtered from the list of iterations.

19. The computer-readable medium of claim 16, wherein the method further comprises:

generating a number of scores based on two or more measures of user activity; and generating an accumulative score from the number of scores, wherein determining that the at least one measure of user activity reaches the one or more thresholds comprises determining that the accumulative score reaches the one or more thresholds, and wherein the version number is determined in response to determining that the accumulative score reaches the one or more thresholds.

* * * * *